United States Patent [19]

Kromrey

[11] 4,214,875

[45] Jul. 29, 1980

[54] COATED COAL PILES

[75] Inventor: Robert V. Kromrey, Burke, Va.

[73] Assignee: Atlantic Research Corporation, Alexandria, Va.

[21] Appl. No.: 929,618

[22] Filed: Jul. 31, 1978

Related U.S. Application Data

[63] Continuation of Ser. No. 794,577, May 6, 1977, abandoned.

[51] Int. Cl.³ .................. C08L 91/06; C10L 5/00
[52] U.S. Cl. ................................. 44/6; 106/272; 106/281 R; 260/28.5 R
[58] Field of Search .............. 44/6; 106/272, 281; 260/28.5 R

[56] References Cited

U.S. PATENT DOCUMENTS

| 89,186 | 4/1869 | Von Tagen | 106/281 N |
|---|---|---|---|
| 565,675 | 8/1896 | Dumble | 106/281 R |
| 1,912,697 | 6/1933 | Fife | 44/6 |
| 2,204,781 | 6/1940 | Wattles | 44/6 |
| 2,512,459 | 6/1950 | Hamilton | 260/28.5 R |
| 2,635,054 | 4/1953 | Doyle et al. | 106/272 |
| 2,714,584 | 8/1955 | Küster | 260/28.5 R |
| 3,009,863 | 11/1961 | Angevine | 202/26 |
| 3,073,710 | 1/1963 | Morrow et al. | 106/281 R |

OTHER PUBLICATIONS

Chem. Abst. 54:25,783h.

*Primary Examiner*—Theodore Morris
*Attorney, Agent, or Firm*—Martha L. Ross

[57] ABSTRACT

Coal pile coating compositions comprising a wax or wax and organic polymer binder and a major proportion of solid particulate organic filler. A process for coating the exposed surface(s) of coal piles with coating compositions comprising an organic binder comprising wax, pitch, asphalt, or tar or said materials including an organic polymer dispersed therein, plus a major proportion of a particulate organic filler. The coated coal piles produced thereby.

60 Claims, No Drawings

COATED COAL PILES

This is a continuation of application Ser. No. 794,577, filed May 6, 1977, now abandoned.

BACKGROUND

It is well known that coal piles having at least one surface exposed to the atmosphere suffer from a number of disadvantageous conditions. For purposes of this specification and claims, the term "pile" encompasses any conglomeration of coal lumps, e.g., stockpiled on the ground for use in industrial plants, electric utilities, and the like; stowed in open bins, railway freight cars, trucks, and the like; moved by conveyor; and the like.

Some problems which occur regularly in the storage and transportation of coal include the following:

1. Excess moisture in the body of coal caused by excessive humidity, rain, or snow results in:
   (a) loss of fuel value (by as much as 3% or more) due to loss of heat to water evaporation during use;
   (b) Prevention of normal operation of grinding and pulverizing machinery which frequently cause outages in factory or electric utility operation;
   Water freezing which makes it very difficult to remove the coal from the storage pile.
2. The free flow of air through the pile induces auto-oxidation of the coal which can reduce fuel value by as much as 5% or more in a year. Continued auto-oxidation can reach the point of spontaneous combustion, particularly in low-rank coals.
3. Dust and acid leachates emanating from coal piles and conveyers create air and soil pollution and loss of fuel value.
4. Wind and the motion of train or truck can result in:
   (a) physical losses of coal from the upper surface of the pile, and
   (b) generation of coal fines which are not physically usuable as fuel in many facilities and must be segregated and disposed of separately.

Efforts have been made to reduce these problems, but with limited success aside from the fact that they are excessively costly and none has been able to eliminate most of the problems. Layering and compaction of coal stores have been used to reduce void volume and minimize air circulation with only partial success. Costly oil sprays, which have been tried to reduce dusting and oxidation, have been only partially successful. Experiments have shown that spontaneous combustion can be eliminated by vapor deposition of $SiO_2$ on the surface of the coal, but such a solution is impractically costly.

Although certain of the coating compositions containing pitch, alphalt, tars, and the like are somewhat similar to compositions known to the art for such use as roofing materials, mastic tile, the making of carbon articles, e.g., electrodes, and sealing compositions, none has been disclosed for the purpose of the present invention.

The coating of the present invention, when applied to the exposed surface of coal pile (as defined supra), melds into a hard, continuous coating which adheres well to the coal and, when applied to the entire exposed surface, forms an air- and moisture-impervious layer which protects the pile from the problems engendered by excessive moisture and air penetration. Additionally, it substantially eliminates dust and acid leachate emanations and protects piles in transit from physical due to wind and the motion of the vehicle and, because of the immobilizing effect of the hard, continuous surface layer, minimizes generation of coal fines due to frictional motion within the pile during transit.

Thus the surface layers of the invention substantially eliminate loss of fuel value, processing difficulties, and air and soil pollution by substantially eliminating auto-oxidation, spontaneous combustion, excessive moisture, dust emanation, obstructions to handling, wind and motion loss. The coating compositions are low cost, particularly where the lower cost binders and waste material fillers are employed. Their cost, furthermore, is substantially offset by their added fuel-value, since they contribute to the combustion process.

SUMMARY

The coating compositions comprise a binder comprising wax, pitch, asphalt, or tar with or without, preferably with, at least a small proportion of a synthetic organic polymer, dispersed therein, and a filler comprising a particulate organic filler, such as coal fines, bagasse, seed hulls, sawdust, shredded paper, and the like.

The coatings are of a fluid or semi-fluid consistency, generally produced by elevation of the temperature, so that they can be readily applied to the exposed surface(s) of the coal pile. The coatings adhere well to the exposed surface coal in the pile and harden into a tough continuous film of a desired thickness, which, as aforedescribed, is substantially impervious to air and moisture; contain any coal dust and fines within the pile; and prevent physical loss of coal to wind or the motion of a carrying vehicle in transit.

DETAILED DESCRIPTION

The coating includes an organic binder which can be wax, tar, asphalt, pitch, or mixture thereof. These materials can be natural or synthetic. The tars, pitches, and asphalts can be, for example, from natural sources of the residues of petroleum refining or other chemical processes. The waxes can be paraffin waxes of mineral origin, such as petroleum, or of vegetable origin, such as ceresin, caudilla, or carnauba. The paraffin waxes are preferred because of their greater availability and relatively low cost, particularly in the case of such low-grade wax as slack wax or the somewhat higher grade scale wax. Slack wax alone or, preferably, in combination with scale wax, has been found particularly useful in practicing the invention. The scale wax produces a somewhat harder, higher melting point, and higher molecular weight mixture.

It has been found desirable, although not essential, to incorporate into the binder a minor proportion, preferably about 5 to 30%, of a synthetic organic polymer since they result in a somewhat tougher or stronger final coating which does not break easily; minimize stratification or separation of the coating components until the coating solidifies; and may improve melt viscosities. The polymers are preferably thermoplastic. They may, however, be thermosetting plastics in liquid state which harden into solids by cure after application of the coating composition. Examples of suitable polymers include, but are not limited to, polyalkylenes, polyesters, polybutadienes, polystyrene, and the like. In general, the polyalkylenes, such as polyethylene, polypropylene, an polybutylene, are preferred. Polyethylene is particularly preferred.

The synthetic polymer is dispersed, preferably dissolved, in the wax, tar, asphalt, or pitch, prior to incorporation of the filler, generally at elevated temperatures.

The filler, as aforementioned, can be an organic particulate solid, such as coal fines, shredded paper, seed hulls, bagasse, sawdust, and the like. They are preferably waste-type materials because of their low cost. In general, coal fines are preferred because of their frequent on-site availability. Size is not critical, though relatively fine comminution is desirable, e.g., about −10 to +200 Tyler mesh size. The filler is introduced into the binder in major proportion by weight, preferably about 65 to 85%.

In preparing the filled composition, the binder is generally heated sufficiently to provide sufficient fluidity to facilitate uniform mixing and coating of the filler. The particular mixing temperature is, of course, determined by the particular binder. In some cases, the filler may also be preheated to offset excessive temperature reduction of the binder during mixing or to improve binder-wetting of the particles.

The resulting coating compositions while at a temperature determined by the particular fluidity of the composition, e.g., ambient to about 170° C., are generally relatively smooth, viscous materials and are usually, though not necessarily, thixotropic. After application, they harden into tough solid materials which require substantial force for breakage. They also have a relatively low coefficient of expansion which is particularly important as a fissure preventative under widely varying ambient temperature conditions.

The compositions are applied to the exposed coal pile surface in at least a semi-fluid state, if necessary, at elevated temperatures, e.g., about 120° C.-170° C., by any suitable method, such as pump spraying, gun sputtering, and the like. It has been found that the deposited discrete gobs or droplets of the coating, if properly applied to and distributed on the coal, flow sufficiently to meld into a continuous, coal-adherent coating. Any bare spots subsequently found can be filled with added coating material which weld to the original coating. The coatings can be of any desired thickness, e.g., one-quarter inch or less to one inch or more. In general for purposes of economy, the least thickness adequate for the purpose is desirable.

At the time the coal pile requires transfer or use, the coating can be broken to pieces of desired size by the use of devices applying adequate force and then be utilized as fuel together with the coal, including application of coal grinding pulverizing.

EXAMPLE

The followng coating compositions were prepared. Percentages are by weight.

A.

Binder—25% : PE*—10% , slack wax—90%
*polyethylene
Filler—75%: coal fines

B.

Binder—28.6% : PE—15% , slack wax—90%
Filler—71.4%: coal fines

C.

Binder—25%: PE—12% , slack wax—44% , scale wax—44%

In all the above compositions, the coal fines were −35 to +120 Tyler mesh size; the binder was heated to about 135° C.; and the coal fines were heated to somewhat above 100° C. All of the resulting compositions were smooth, semi-fluid, continuous, and thixotropic.

They were each applied at a temperature of about 135° C. to a coal pile by being dropped in gobs from a height of about 4 feet. The gobs on the coal pile surface spread sufficiently to meld into a continuous coating which adhered to the coal at the pile surface and hardened as it cooled into a tough continuous coating, which required application of substantial force to break. Because of the essentially thixotropic nature of the coating composition, there was minimal tendency to sag or spread substantially below the surface portion of the coal pile.

Although this invention has been described with reference to illustrative embodiments thereof, it will be apparent to those skilled in the art that the principles of this invention can be embodied in other forms but within the scope of the claims.

I claim:

1. A process for protecting coal piles comprising: applying a coating composition to surface of the pile exposed to atmosphere, said coating composition prior to said application being in at least semi-fluid state, being capable of solidifying after application of said coating, and being a substantially uniform mixture consisting essentially of a minor proportion of an organic binder, which is wax, tar, asphalt, pitch, or mixtures thereof, and a major proportion of a filler consisting essentially of particulate organic solid distributed substantially uniformly throughout said binder.

2. The process of claim 1 wherein the binder includes a minor proportion of a synthetic organic polymer.

3. The process of claim 2 wherein the polymer is thermoplastic.

4. The process of claim 3 wherein the polymer is polyalkylene.

5. The process of claim 4 wherein the polymer is polyethylene.

6. The process of claim 1 wherein the binder is wax.

7. The process of claim 1 wherein the binder is paraffin wax.

8. The process of claim 2 wherein the binder is paraffin wax.

9. The process of claim 3 wherein the binder is paraffin wax.

10. The process of claim 4 wherein the binder is paraffin wax.

11. The process of claim 5 wherein the binder is paraffin wax.

12. The process of claim 1 wherein the filler is coal fines.

13. The process of claim 2 wherein the filler is coal fines.

14. The process of claim 3 wherein the filler is coal fines.

15. The process of claim 4 wherein the filler is coal fines.

16. The process of claim 5 wherein the filler is coal fines.

17. The process of claim 6 wherein the filler is coal fines.

18. The process of claim 7 wherein the filler is coal fines.

19. The process of claim 8 wherein the filler is coal fines.

20. The process of claim 9 wherein the filler is coal fines.

21. The process of claim 10 wherein the filler is coal fines.

22. The process of claim 11 wherein the filler is coal fines.

23. A coal pile having surface exposed to atmosphere coated with a substantially continuous solid coating composition, said coating composition substantially entirely consisting essentially of a minor proportion of an organic binder, which is wax, tar, asphalt, pitch or mixtures thereof, and a major proportion of a filler comprising particulate organic solid, said major proportion of filler being substantially uniformly distributed throughout said binder 24. The coal pile of claim 23 wherein the binder includes a minor proportion of an organic polymer.

25. The coal pile of claim 24 wherein the polymer is thermoplastic.

26. The coal pile of claim 25 wherein the polymer is polyalkylene.

27. The coal pile of claim 26 wherein the binder is polyethylene.

28. The coal pile of claim 23 wherein the binder is wax.

29. The coal pile of claim 23 wherein the binder is paraffin wax.

30. The coal pile of cliam 24 wherein the binder is paraffin wax.

31. The coal pile of claim 25 wherein the binder is paraffin wax.

32. The coal pile of claim 26 wherein the binder is paraffin wax.

33. The coal pile of claim 27 wherein the binder is paraffin wax.

34. The coal pile of claim 23 wherein the filler is coal fines.

35. The coal pile of claim 24 wherein the filler is coal fines.

36. The coal pile of claim 25 wherein the filler is coal fines.

37. The coal pile of claim 26 wherein the filler is coal fines.

38. The coal pile of claim 27 wherein the filler is coal fines.

39. The coal pile of claim 28 wherein the filler is coal fines.

40. The coal pile of claim 29 wherein the filler is coal fines.

41. The coal pile of claim 30 wherein the filler is coal fines.

42. The coal pile of claim 31 wherein the filler is coal fines.

43. The coal pile of claim 32 wherein the filler is coal fines.

44. The coal pile of claim 33 wherein the filler is coal fines.

45. A self-contained integral composition consisting essentially of a substantially uniform mixture consisting essentially of a minor proportion of binder consisting essentially of wax and synthetic organic polymer, said polymer being in minor proportion in said binder, and a major proportion of coal fines, said major proportion of coal fines being substantially uniformly distributed throughtout said binder, said composition being particularly adapted for application to surface of a coal pile exposed to atmosphere to form a coating thereon.

46. The composition of claim 45 wherein the wax is paraffin wax.

47. The composition of claim 46 wherein the wax is slack wax.

48. The composition of claim 46 wherein the wax is a mixture of slack wax and scale wax.

49. The composition of claim 45 wherein the polymer is thermoplastic.

50. The composition of claim 46 wherein the polymer is thermoplastic.

51. The composition of claim 47 wherein the polymer is thermosplastic.

52. The composition of claim 48 wherein the polymer is thermoplastic.

53. The composition of claim 49 wherein the polymer is polyalkylene.

54. The composition of claim 50 wherein the polymer is polyalkylene.

55. The composition of claim 51 wherein the polymer is polyalkylene.

56. The composition of claim 52 wherein the polymer is polyalkylene.

57. The composition of claim 53 wherein the polymer is polyethylene.

58. The composition of claim 54 wherein the polymer is polyethylene.

59. The composition of claim 55 wherein the polymer is polyethylene.

60. The composition of claim 56 wherein the polymer is polyethylene.

* * * * *

UNITED STATES PATENT AND TRADEMARK OFFICE
CERTIFICATE OF CORRECTION

PATENT NO.  : 4,214,875
DATED       : July 29, 1980
INVENTOR(S) : Robert V. Kromery It is certified that error appears in the above-identified patent and that said Letters Patent are hereby corrected as shown below:

Column 2, line 65, after "propylene", cancel "an" and substitute and

Column 3, Example C, add below line 2 ("wax - 44%) the following:

Filler - 75%:coal fines

Signed and Sealed this

Seventeenth Day of February 1981

[SEAL]

Attest:

Attesting Officer

RENE D. TEGTMEYER

Acting Commissioner of Patents and Trademarks